350-168 SR
8/17/76 XR 3,975,101

United States Patent [19] [11] 3,975,101
Copeland [45] Aug. 17, 1976

[54] METHOD OF DETERMINING OPERATING CONDITION OF CITY STREET LIGHTING UNITS

[76] Inventor: Robert W. Copeland, 43, Station Road, Keswick, Cumberland, England

[22] Filed: June 13, 1974

[21] Appl. No.: 478,851

[52] U.S. Cl. .................................. 356/162; 240/25; 240/41.38 A; 350/168

[51] Int. Cl.[2] .......................................... G01B 11/00

[58] Field of Search .................... 356/156, 162–166, 356/168; 240/25, 41.38, 71

[56] References Cited

OTHER PUBLICATIONS

*Light and Lighting*, vol. 59, No. 5, May, 1966, p. XIII.

Ives, H. E., *Airplane Photography*, J. B. Lippincott Co., Philadelphia & London, 1920, pp. 291 and 295.

*Primary Examiner*—John K. Corbin
*Assistant Examiner*—F. L. Evans
*Attorney, Agent, or Firm*—John E. Prothroe

[57] ABSTRACT

Method for visually checking the lighted condition of a plurality of ground light sources, such as municipal street lighting, by taking a night aerial photograph of an optimum area when all ground lighting in the area is known to be functional, and using such photograph as a master reference for subsequent night aerial photographs of the same area by comparison means. Apparatus is disclosed for upwardly directing a component of each ground light, and altering the quality of such component in order to distinguish.

1 Claim, 3 Drawing Figures

METHOD OF DETERMINING OPERATING CONDITION OF CITY STREET LIGHTING UNITS

This invention relates to a method for determining the illumination condition of a plurality of light sources in order to determine whether any member of such plurality of light sources is malfunctioning. More particularly, the invention is directed to a method of determining the illumination condition of a plurality of ground illumination sources, such as street lights, in order to determine whether one or more of such sources is malfunctioning.

Determining the condition of street lighting in a modern city in which there may be several hundred thousand street lights, has become a problem of increasing dimension with increasing labor costs. In the prior art systems, it has been conventional for a lighting crew to patrol the streets at night in order to visually observe the condition of street lights. Light sources which are visually noted to have failed, are then recorded on a street grid, and service crews are notified so that in daylight hours the malfunctioning light source may be corrected, usually by replacement of the bulb, luminescent tube, or arc light source.

Such prior art checking methods are costly of labor and equipment, requiring a vehicle with a minimum crew of two, consisting of driver and observer.

The present invention provides a method for economically and quickly surveying an illumination system by means of aerial photography, in which each ground light source is provided with means for directing radiation vertically and optionally altering the quality of such radiation so that it photographically distinguishes from the adjacent radiation sources, photographically recording such radiation source matrix and comparing the photographic record thus obtained with a previous master photographic radiation source for indication of failure or malfunctioning of light sources. Conventional grid techniques enable the location of non-illuminated light sources to be precisely located, and such data are then directly utilized by lighting maintenance crews in servicing the faulty equipment.

Accordingly, it is the principal object of this invention to provide a method for surveying a ground illumination system by means of comparative aerial photographs, optionally including the further improvement of altering the quality of an upwardly-directed component of each ground light source in order to distinguish it from adjacent light sources in order to facilitate comparison.

More particularly, it is an object of this invention to provide a method of the foregoing description, in which an aerial photograph is taken of a ground illumination system and comparing such photographic record thereby obtained with a previous master photographic radiation source record for indication of any malfunctioning light source.

Briefly stated, in a survey system for night photography in accordance with this invention, a master photographic radiation source record is obtained, of an optimum area of an inhabited illuminated area, when all light sources are functioning. Desirably, each light source will have a generally vertically directed component originating directly from the light source, although in the method of this invention, reasonably satisfactory results have been obtained using only ground reflection from overhead light sources incorporating downwardly-directing reflectors. Desirably further optionally, the character of the upwardly-directed component from the light source will be altered, by means of colorization, alteration of wave length or other like physical means, in order to distinguish such beam from adjacent light sources which may interfere with the desired result. An enlargement is then made of the photographic negative, or a screen projection of the photographic negative obtained from the aerial camera and, by means of overlay methods, a comparison is made between the initial record and subsequent photograph records of the ground illumination system, so that ground illumination sources which are malfunctioning will be indicated by, for example, dark points on the overlay, when normally lighted points would be expected.

For a better understanding of the invention as well as other objects and further features thereof, reference is made to the following detailed description to be read in conjunction with the accompanying drawings, wherein like components in the various views are identified by like reference numerals.

Figure 1:
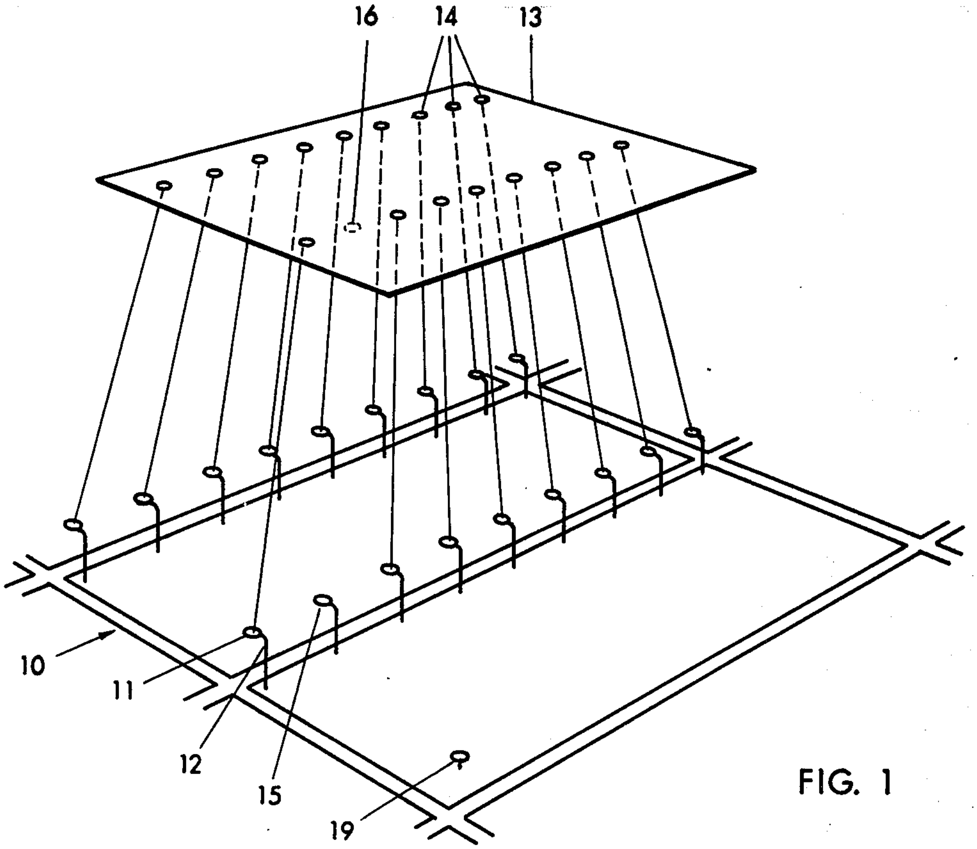
FIG. 1 is a schematic perspective of a portion of a ground lighting system of a typical city, and an aerial photographic record thereof depicting street lamps having upwardly-directed beam components.
Figure 2:
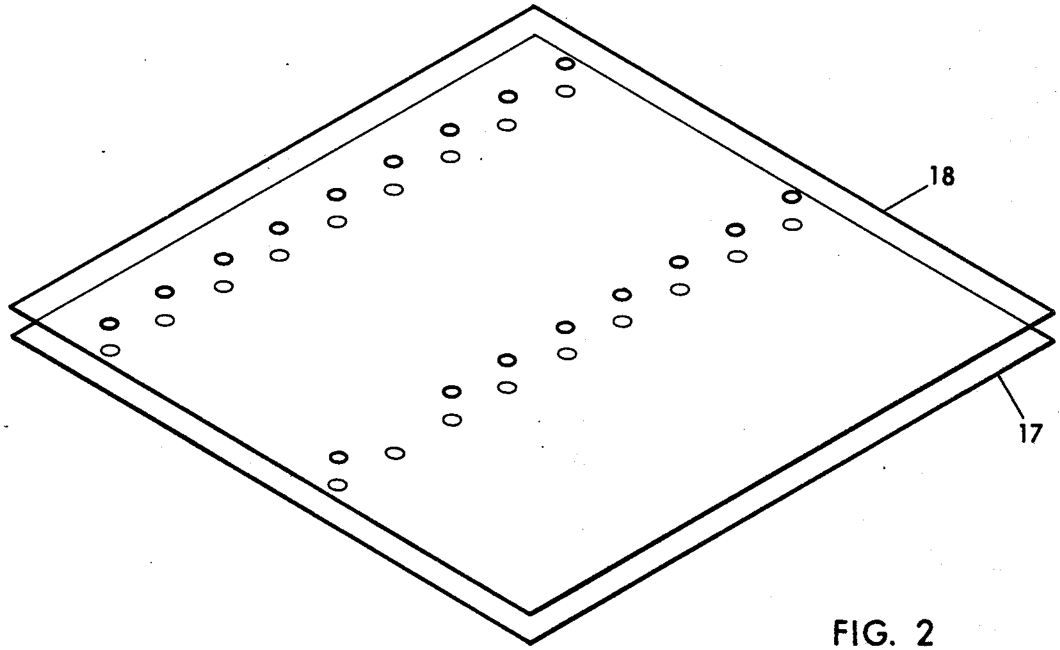
FIG. 2 is a perspective view of the photographic record of FIG. 1, with subsequent overlay, depicting a representative malfunctioning of several light sources.

Referring now to the drawings, and more particularly to FIGS. 1 and 2, a section of a typical city street system is designated generally by the numeral 10. Individual street lamp locations are indicated at 11, from typical street lighting standards, 12.

An aerial film is schematically depicted at 13 in FIG. 1, upon which is recorded at 14 the upwardly-directed beam component of each functioning street light. A non-functioning street light 15 is depicted in FIG. 1, which leaves a blank spot depicted at 16 on the aerial film 13.

FIG. 2 depicts the base photographic record 17 of FIG. 1, recording all street lamps in functioning condition. An overlay 18, derived from the exposed film 13, is superimposed thereon, for visual or optical correlation of the light source records. Sheets 17 and 18 are depicted as enlarged transparencies, prepared from photographic film, exposed in a conventional aerial camera.

When the records are thus compared, the blank spot is identified by co-ordinates, and repair action is initiated by a ground repair crew.

In FIGS. 1 and 2, an unrelated energy source 19 is depicted, such as an adjacent light source; such is not recorded because of screening means, resulting in positive identification of the energy emitted by the lighting system under study. This identification of the energy emissions is accomplished by various combinations of unique transmission and filtering of the energy emissions, to which reference will be hereafter made.

For accurate comparison purposes, it is essential that the successive overflights be carried out at substantially constant elevations, to permit accurate comparison of the photographic results obtained.

Data suggests that, under normal circumstances, surveys obtained over intervals of two to three months are adequate for non-arterial streets, while shorter intervals may be necessary for freeways, expressways and the like, where illumination maintenance standards are more rigorous.

Figure 3:
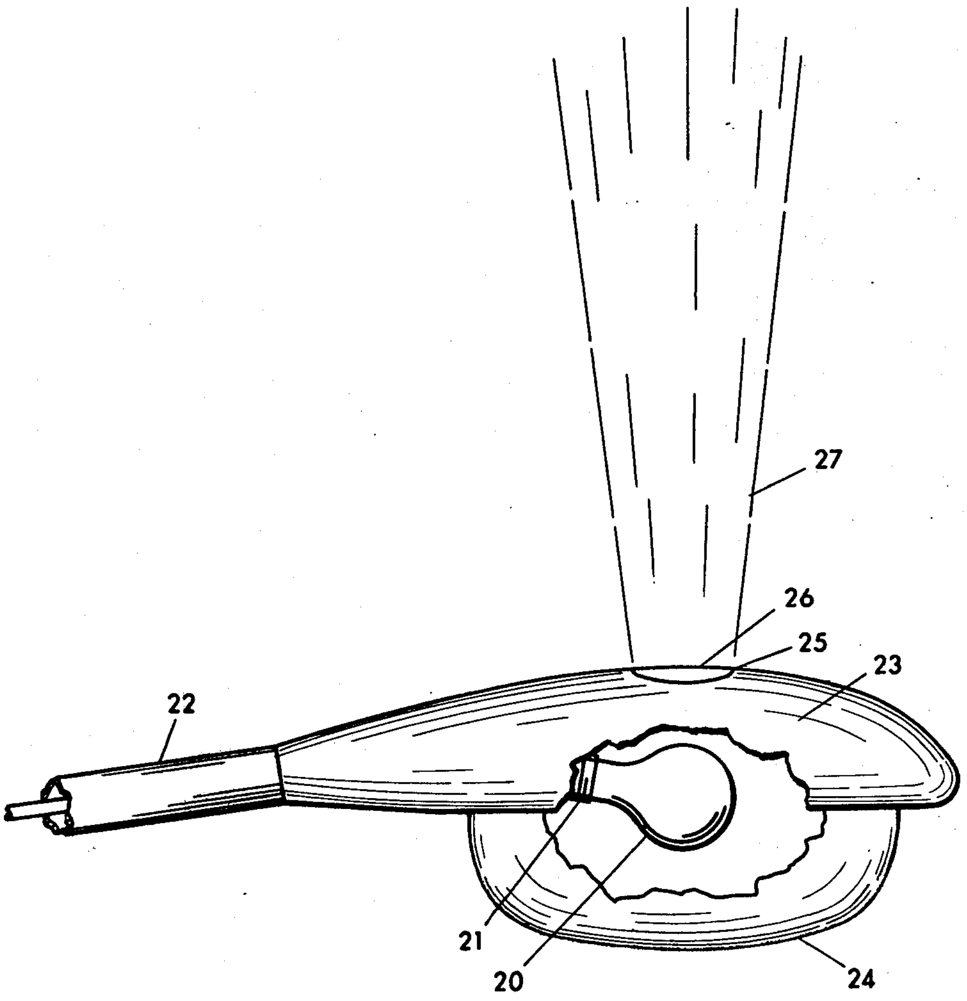
FIG. 3 is a perspective view of a street lamp assembly, including a reflector, with means for directing a component of the street lamp beam generally vertically, after having altered the character or quality thereof so that the same may be distinguished from adjacent possibly-interfering light sources.

Turning now to the specific equipment involved at the light source, FIG. 3 depicts a typical incandescent street lighting unit, of the type currently used on residential streets in North American cities, in which an incandescent bulb 20 is mounted in a socket 21, electrically wired through a mounting arm 22, rigidly secured to a downwardly-directing reflector 23. Weather protection is provided by the transparent or translucent glass cover 24, removably secured to the reflector 23.

An aperture 25, is provided on the upper surface of the reflector 23, through which a small portion of the illumination from the bulb 20 is directed generally vertically, by means of a lens 26, mounted within the aperture 25. The lens 26 may be polarizing, by which the upwardly-directed beam 27 is polarized in a specific orientation, in common with all other light sources under surveillance within the survey area. Alternatively, a color filter may be inserted within the aperture 25, so that the beam 27 is color-tagged, in a manner to distinguish it from adjacent light sources.

In fluorescent lighting units, or high intensity lighting units of the mercury or sodium vapor or inert gas type, all of which will be familiar to those knowledgeable in the art to which this invention relates, apertures similar to that depicted at 25 in FIG. 3, with lenses and identifying filter, can readily be adapted for the purposes described.

The foregoing description has been directed to the use of the invention for municipal street lighting purposes, but it is obvious that it may readily be adapted for analogous uses, such as, for example, airport marker lights, stadium lighting and park lighting.

It will further be appreciated that the energy from the street lighting units may be waves having frequencies varying from the infra red range to radio frequency, such energy generators being activated when the associated light source is activated, and being non-functional when the associated light source is non-functional.

While the type of aerial survey in most probable common use contemplated by the method of this invention is an aerial photographic camera mounted in a conventional survey aircraft, the method and operation of this invention is readily adaptable to surveillance at greater altitudes from space vehicles.

While the preferred embodiment of the invention has been described in detail, it is to be understood that the invention is not limited to such details, but instead embraces such embodiments of the broad concept as fall within the scope of the appended claims.

What is claimed is:

1. A surveillance method for a municipal street lighting system for identifying non-functioning street lights within said system comprising the steps of:

a. selecting an area of said municipal street lighting system, b. making a reference aerial photograph of said selected area while all street lights in the photographed area are operative for recording the locations of the street lights therein while screening out light from other sources so that light from said other sources is not recorded, c. subsequently making another aerial photograph of said selected area for recording the locations of the street lights therein while screening out light from other sources, d. superimposing said other photograph and said reference photograph and thereby determining the location of street lights not shown on said other photograph from said reference photograph.

* * * * *